Feb. 3, 1959     A. B. EUGA     2,871,827
BRAKE MOTOR

Original Filed July 31, 1950     2 Sheets-Sheet 1

INVENTOR.
ARTHUR B. EUGA
BY Schmieding and Fultz
ATTORNEYS

Feb. 3, 1959

A. B. EUGA 2,871,827

BRAKE MOTOR

Original Filed July 31, 1950

INVENTOR.
ARTHUR B. EUGA

BY *Schmieding and Fultz*

ATTORNEYS

United States Patent Office 2,871,827
Patented Feb. 3, 1959

2,871,827
BRAKE MOTOR
Arthur B. Euga, Columbus, Ohio
Continuation of application Serial No. 176,785, July 31, 1950. This application February 8, 1956, Serial No. 564,315

15 Claims. (Cl. 121—38)

This application relates generally to braking systems for vehicles of the type wherein auxiliary braking means are provided for actuating the brake mechanisms upon failure of the service braking system of the vehicle, and particularly to novel fluid actuated brake cylinders for such systems.

The present application is a continuation of my co-pending application Serial Number 176,785, filed July 31, 1950, now abandoned.

Figure 1:
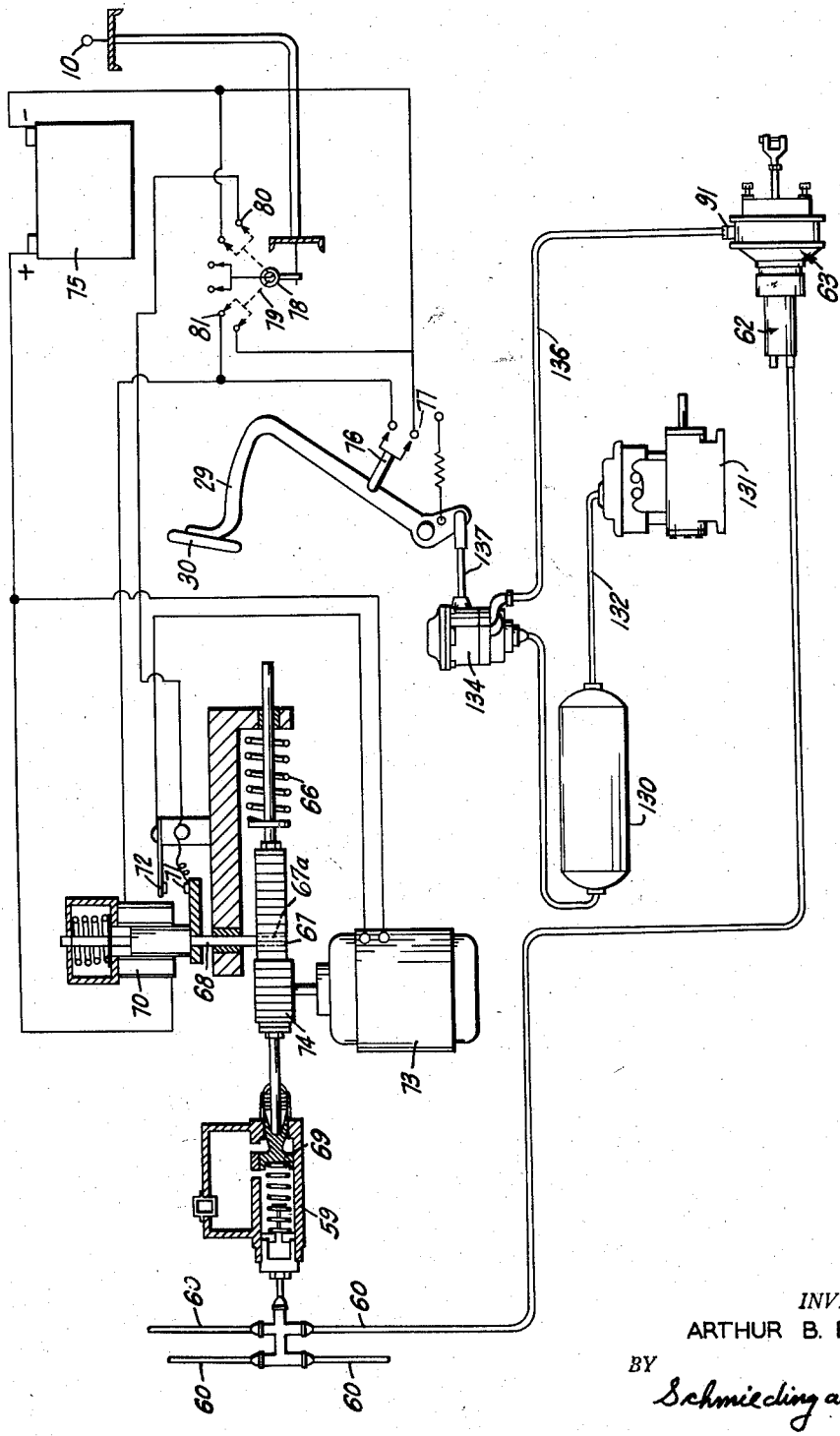
Figure 1 is a diagrammatic view of a brake system which includes a fluid actuated brake cylinder constructed according to the present invention.

Figure 1 illustrates a modification adaptable to heavy trucks, tractors and trailers, or other heavy vehicles, wherein an electro-mechanical means is used to trip a latch pin, and an auxiliary fluid actuated system is used to actuate the wheel brake mechanisms. Energy may be stored in a releasably secured and compressed coil spring 66 used to displace the operating fluid in a master cylinder 59, the latter being in communication with an overcylinder or fluid motor 62 adapted for actuation of a wheel brake mechanism.

The service brake system of the air brake system of Figure 1 includes a reservoir 130 of compressed air supplied by a compressor 131 through the line 132. A control valve 134 serves to release air from reservoir 130 through line 136 and inlet passage 91 to an air brake chamber 63.

Valve 134 may be of the conventional type used in connection with air brake systems for vehicles and is connected to a suitable lever, such as pivoted pedal 29, by means of a rod 137 whereby depression of pedal 29 releases air from reservoir 130 to air brake chamber 63.

With reference to Figure 1, 59 denotes a master hydraulic cylinder, having alternative extending fluid lines 60 each of which is in communication with an overcylinder 62 of a wheel air brake chamber 63. The piston 69 of master cylinder 59 is adapted for actuation by a releasably secured and compressed coil spring 66, the latter being arranged to impart its energy through a slidably mounted rack 67, which is releasably secured by a spring returned latch pin 68, to the piston 69 of the master cylinder 59.

As best seen in Figure 1 latch pin 68 is arranged in a manner such that it may be used as the plunger of the armature of an electrically energizable solenoid 70. Secured to the latch pin 68 is a part 71 which functions as the movable contacting element of a normally open single pole switch for which 72 is the fixed contacting element, said movable and fixed elements being in the circuit of an electric motor 73 having a shafted pinion 74 in engagement with the slidably mounted rack 67, said motor being provided for resetting the brake control means after each actuation thereof. Power for energizing the solenoid 70 and the motor 73 may be obtained from the usual electrical system of the vehicle or from a separate source, e. g. a battery 75, as shown.

Medially secured to the pivoted foot lever 29 is a part 76 which functions as the movable contacting element of a single pole switch for which 77 are the fixed contacting elements, said movable and fixed elements being in the electrical circuit of the solenoid 70 and power source 75.

A single pole double throw drum switch having suitable control means mounted above the vehicle dash structure, includes a revolvable drum 79 as its movable contacting element, fixed contacting elements 80 in circuit with the resetting motor 73, and fixed contacting elements 81 in circuit with the solenoid 70 and in parallel connection with the fixed contacting elements 77 of the pedal switch, is provided for alternative use as a resetting control switch or as a manual (hand) actuating control switch for energizing the auxiliary system. As seen in the figures, the drum switch is provided with a natural "off" position and "on" position 81 for manual actuation of the emergency system by a remote control actuator 10.

During normal operation of the vehicle the switch 78 is centered, as seen in the Figure 1, with the contacts 80 and 81 open so that solenoid 70 is not energized. Hence closing of contacts 77 by element 76 on lever 29 will energize solenoid 70 to withdraw latch pin 68 and permit actuation of the master cylinder 59 of the emergency system. It will be noted that resetting motor 73 will remain inoperative, even though contacts 71 and 72 are closed by solenoid 70, until the contacts 80 have been bridged by manual actuation of switch 78.

Figure 2:
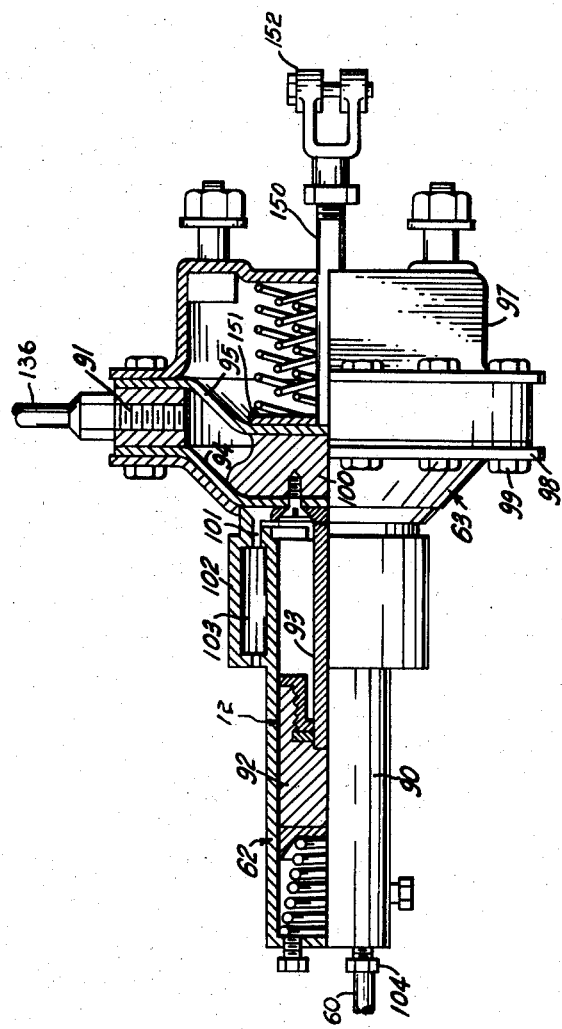
Figure 2 is an elevational view, partially in section, showing the interior of the air brake chamber comprising a portion of the apparatus of Figure 1.

In Figure 2, 62 is the overcylinder or fluid motor which is provided for actuation of the wheel air brake chamber 63, the latter being served by a usual air line 136 through the inlet passage 91. A piston means indicated generally at 12 includes a pressure sealed piston 92 slidably disposed within overcylinder 62 and a depending portion 93 which is rigily secured by any suitable fastening means to a flexible diaphragm or seal 94, the latter being disposed rearwardly of the usual air actuated diaphragm 95 by a spacing ring 96 which is rigidly secured between the forward casing 97 and cover 98 of the air brake chamber 63 by a plurality of clamping bolts 99, and by a spacer 100 which is rigidly secured to the diaphragm 94 and depending portion 93 of the piston 92. The overcylinder 62 is provided with a plurality of air venting apertures 101, a dust cover 102 having further terminal air venting holes 103, and an inlet passage 104 in a communication with a pressure line as shown by 60 in Figure 1.

The air brake chamber of Figure 2 further includes a brake actuating rod 150. Flexible diaphragm 95 is in force transmitting engagement with a flange 151 on one end of brake actuating rod 150 and a clevis 152 is mounted on the other end of brake actuating rod 150 for the purpose of attaching the rod to a conventional brake shoe mechanism, not illustrated.

With reference to the operation of the apparatus, it will be understood from Figure 1 that with a downward and continued movement of the pedal 30 termination of lever 29 will cause the switch part 76 to bridge the fixed contacting elements 77 thus closing the electrical circuit to the solenoid 70. The latch pin 68 is thus retracted by the magnetic field of the solenoid 70 and the rack 67 thereby released. The potential energy of the coil spring is imparted to the piston 69 through the slidably mounted rack 67 and the piston 69 is driven into the cylinder 59 causing a displacement of the operating fluid therein to the hydraulic overcylinder 62 of the air brake motor 63. The increased fluid pressure in overcylinder 62 causes the piston 92 to be driven further into the overcylinder, thereby flexing the diaphragm 95 through the auxiliary diaphragm 94 and spacing member 100. In the event of a total or partial loss of fluid action the brakes are automatically actuated through the hydraulic overcylinder 62.

With reference to Figure 1, the actuating means of the auxiliary system can be manually operated by switch 78 by causing the conductor 79 to bridge the contacts 81 to energize solenoid 70.

To provide means for resetting the actuating means of the auxiliary system of Figure 1, an electric motor 73 is provided with a pinion 74 which engages a rack 67 connected to the piston 69 of master cylinder 59. Rack 67 includes a hole or latch portion 67–a.

In order to operate resetting motor 73 it is necessary that a movable contact 71 be in engagement with a stationary contact 72 which engagement will occur when solenoid 70 is actuated since movable contact 71 is carried on latch pin 68. When latch pin 68 is latched with latch portion 67–a contacts 71 and 72 are in the normally open position illustrated. It is also necessary, in order to operate motor 73, that the contacts 80 of switch 78 be manually closed. It will therefore be understood that once the auxiliary brake system has been actuated, it is necessary to manually set the switch 78 to bridge contacts 80 before the motor will become energized to reset the actuating mechanism of the auxiliary system to cause the spring of solenoid 70 to move latch pin 68 to enter hole 67–a whereby contact 71 is moved away from contact 72.

What is claimed is:

1. An improved brake cylinder construction for the braking system of a vehicle which construction comprises, in combination, casing means; a brake actuating rod; a moveable wall means in said casing and forming a wall of a chamber provided with an intake port for receiving pressurized fluid, said moveable wall being in force transmitting relationship with said brake actuating rod; a hydraulic motor; and means for transmitting force from said motor to said moveable wall means including an element moveable relative to said casing means, said element being separable from said moveable wall when said chamber is pressurized but in force transmitting engagement with said moveable wall when said hydraulic motor is energized.

2. An improved brake cylinder construction for the braking system of a vehicle which construction comprises, in combination, casing means; a moveable wall means in said casing and forming a wall of a chamber provided with an intake port for receiving pressurized fluid; a brake actuating rod on one side of said moveable wall and in force receiving engagement therewith; hydraulic cylinder means on the other side of said moveable wall and including an open end confronting said chamber; a piston carried in said cylinder means; means for transmitting force between said piston and said moveable wall, said means being separable from said moveable wall when said chamber is pressurized but in force transmitting engagement with said moveable wall when said hydraulic cylinder means is energized; and sealing means between said chamber and said confronting open end of said cylinder.

3. An improved brake cylinder construction for the braking system of a vehicle which construction comprises, in combination, casing means; a flexible diaphragm means in said casing and forming a wall of a chamber provided with an intake port for receiving pressurized air; a brake actuating rod in force receiving engagement with one side of said diaphragm means; and a hydraulic motor including piston means moveable relative to said casing means, said piston means being separable from said diaphragm means when said chamber is pressurized but in force transmitting engagement with the other side of said diaphragm means when said hydraulic motor is energized.

4. An improved brake cylinder construction for the braking system of a vehicle which construction comprises, in combination, casing means; a flexible diaphragm means in said casing and forming a wall of a chamber provided with an intake port for receiving pressurized air; a brake actuating rod in force receiving engagement with one side of said diaphragm means; hydraulic cylinder means including an open end confronting said chamber; piston means slideably carried in said cylinder means, said piston means being separable from said diaphragm means when said chamber is pressurized but in force transmitting engagement with the other side of said diaphragm means when said hydraulic cylinder means in energized; and sealing means for the prevention of leakage between said chamber and said confronting open end of said hydraulic cylinder means.

5. A hydraulic-pneumatic brake cylinder construction for the braking system of a vehicle, said construction comprising, in combination, casing means including a front casing portion forming an air chamber provided with an intake port and a rear casing portion forming a hydraulic cylinder; a brake actuating rod; a moveable wall in said front casing portion and in force transmitting relationship with said brake actuating rod; and piston means in said hydraulic cylinder, said piston means being separable from said moveable wall when said chamber is pressurized but in force transmitting relationship with said movable wall when said hydraulic cylinder is pressurized.

6. A hydraulic-pneumatic brake cylinder construction for the braking system of a vehicle, said construction comprising, in combination, casing means including a front casing portion forming an air chamber provided with an intake port and a rear casing portion forming a hydraulic cylinder; a brake actuating rod; a moveable wall in said front casing portion and in force transmitting relationship with said brake actuating rod; piston means in said hydraulic cylinder, said piston means being separable from said moveable wall when said chamber is pressurized but in force transmitting relationship with said moveable wall when said hydraulic cylinder is pressurized; and means for the prevention of fluid leakage between said casing portions.

7. An improved brake cylinder construction for the braking system of a vehicle which construction comprises, in combination, a casing; a brake actuating rod; a flexible diaphragm means including a first side abutting an end of said rod and a second side forming a wall of a sealed chamber provided with a fluid intake port; means forming a cylinder for receiving pressurized hydraulic fluid; and force transmitting means including a portion forming a piston means slidably carried in said cylinder and an end abutting said second side of said diaphragm means when said cylinder is pressurized but separable from said second side when said sealed chamber is pressurized.

8. An improved brake cylinder construction for the braking system of a vehicle which construction comprises, in combination, a casing; a brake actuating rod, a flexible diaphragm means including a first side abutting an end of said rod and a second side forming a wall of a sealed chamber; means forming a cylinder for receiving pressurized hydraulic fluid; force transmitting means including a portion forming a piston means slidably carried in said cylinder and an end abutting said second side of said diaphragm means when said cylinder is pressurized but separable from said second side when said sealed chamber is pressurized; and a flexible seal between said force transmitting means and said casing.

9. The apparatus defined in claim 5 wherein said piston means includes a spacer portion in said air chamber, said spacer portion being in force transmitting relationship with said moveable wall.

10. The apparatus defined in claim 5 wherein a return spring is operatively interposed between said moveable wall and said casing means.

11. The apparatus defined in claim 5 wherein said casing means includes a fluid vent between said chamber and said cylinder.

12. The apparatus defined in claim 6 wherein said means for prevention of fluid leakage is provided by a flexible seal interposed between said casing means and said piston means.

13. The apparatus defined in claim 7 wherein said piston means includes a spacer portion in said sealed chamber and engageable with said flexible diaphragm means.

14. The apparatus defined in claim 7 wherein a return spring is operatively interposed between said diaphragm means and said casing.

15. The apparatus defined in claim 7 wherein said casing includes a fluid vent between said sealed chamber and said cylinder.

References Cited in the file of this patent

UNITED STATES PATENTS

| | | |
|---|---|---|
| 1,270,722 | Gillette | June 25, 1918 |
| 1,549,772 | Hukill | Aug. 18, 1925 |
| 1,648,052 | Kennedy | Nov. 8, 1927 |
| 1,742,444 | Gruss | Jan. 7, 1930 |
| 1,885,580 | Bradbury | Nov. 1, 1932 |
| 2,037,055 | Wills et al. | Apr. 14, 1936 |
| 2,065,259 | Ball et al. | Dec. 22, 1936 |
| 2,149,106 | Stitt | Feb. 28, 1939 |
| 2,185,261 | Leupold | Jan. 2, 1940 |
| 2,189,192 | Brock et al. | Feb. 6, 1940 |
| 2,197,075 | Fitzgerald | Apr. 16, 1940 |
| 2,317,194 | Humphrey | Apr. 20, 1943 |
| 2,365,557 | Keith | Dec. 19, 1944 |
| 2,394,343 | Vorech | Feb. 5, 1946 |
| 2,409,908 | Simpkins | Oct. 22, 1946 |
| 2,418,666 | Rockwell | Apr. 8, 1947 |
| 2,493,337 | Zeilman | Jan. 3, 1950 |
| 2,533,902 | Sime | Dec. 12, 1950 |
| 2,544,997 | Keim et al. | Mar. 13, 1951 |
| 2,569,226 | Carter | Sept. 25, 1951 |
| 2,569,610 | Ingres | Oct. 2, 1951 |
| 2,578,388 | Ambler | Dec. 11, 1951 |
| 2,626,021 | McAlpine | Jan. 20, 1953 |
| 2,649,169 | Holman | Aug. 18, 1953 |
| 2,670,817 | Tripp | Mar. 2, 1954 |
| 2,680,654 | Edge et al. | June 8, 1954 |
| 2,726,738 | Farwick | Dec. 13, 1955 |
| 2,754,805 | Beman | July 17, 1956 |

FOREIGN PATENTS

| | | |
|---|---|---|
| 779,383 | France | Apr. 3, 1935 |
| 904,381 | Germany | Feb. 18, 1954 |
| 203,071 | Great Britain | Sept. 6, 1923 |
| 426,630 | Great Britain | Apr. 1, 1935 |
| 497,226 | Great Britain | Dec. 14, 1938 |
| 742,876 | Great Britain | Jan. 4, 1956 |